United States Patent
Kimoto et al.

(10) Patent No.: US 9,501,270 B2
(45) Date of Patent: Nov. 22, 2016

(54) SYSTEM AND METHOD FOR PROVIDING CUSTOMIZED RESOURCES ON A HANDHELD ELECTRONIC DEVICE

(71) Applicant: Motorola Mobility LLC, Chicago, IL (US)

(72) Inventors: Yukiko Kimoto, Mundelein, IL (US); Limor P Marco, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 60 days.

(21) Appl. No.: 14/300,280

(22) Filed: Jun. 10, 2014

(65) Prior Publication Data

US 2015/0277885 A1 Oct. 1, 2015

Related U.S. Application Data (60) Provisional application No. 61/973,051, filed on Mar. 31, 2014.

(51) Int. Cl.
  *G06F 9/445* (2006.01)
  *G06F 9/44* (2006.01)

(52) U.S. Cl.
  CPC . *G06F 8/61* (2013.01); *G06F 8/71* (2013.01); *G06F 9/4448* (2013.01)

(58) Field of Classification Search
  None
  See application file for complete search history.

(56) References Cited

U.S. PATENT DOCUMENTS

| 6,173,335 B1 * | 1/2001 | Culbert | G06F 8/60 719/310 |
| 6,898,591 B1 * | 5/2005 | Moon | G06F 17/3089 |
| 6,973,647 B2 * | 12/2005 | Crudele | G06F 8/61 717/177 |

(Continued)

FOREIGN PATENT DOCUMENTS

| EP | 2076001 A1 | 7/2009 |
| EP | 2341695 A2 | 7/2011 |
| EP | 2515512 A1 | 10/2012 |

OTHER PUBLICATIONS

Nuno, "Removing Unused Languages in Swype", ncatarino.net [online], 2011 [retrieved Jul. 12, 2016], Retrieved from Internet: <URL: http://ncatarino.net/archives/1042>, pp. 1-2.*

(Continued)

*Primary Examiner* — Todd Aguilera
(74) *Attorney, Agent, or Firm* — Shumaker & Sieffert, P.A.

(57) ABSTRACT

A system and methods for customizing operating system and application resources on an electronic device are described. Methods of operation include checking for an optimization tag in an application file prior to installing the application file on an electronic device, checking properties of the electronic device in response to detecting the optimization tag, purging resource files that are not necessary for the electronic device based on the electronic device properties, and installing the application on the device. The system and methods, among other advantages in addition to providing customization, reduce file storage in a memory of an electronic device by eliminating resource file duplications.

14 Claims, 5 Drawing Sheets

(56) References Cited

U.S. PATENT DOCUMENTS

| | | | |
|---|---|---|---|
| 8,161,471 B2* | 4/2012 | Williams | G06F 8/61 717/166 |
| 8,397,155 B1* | 3/2013 | Szabo | G06F 17/00 715/209 |
| 8,533,723 B1 | 9/2013 | Badenell et al. | |
| 2002/0010910 A1* | 1/2002 | Crudele | G06F 8/61 717/128 |
| 2003/0056029 A1* | 3/2003 | Huang | G06F 9/44521 719/328 |
| 2004/0012628 A1 | 1/2004 | Kropf et al. | |
| 2005/0172284 A1* | 8/2005 | Dandekar | G06F 8/61 717/175 |
| 2005/0251562 A1 | 11/2005 | Hauduc et al. | |
| 2008/0134169 A1* | 6/2008 | Williams | G06F 8/61 717/175 |
| 2010/0186009 A1* | 7/2010 | Sen | G06F 8/61 717/178 |
| 2011/0072421 A1* | 3/2011 | Parry | G06F 8/65 717/168 |
| 2013/0198720 A1 | 8/2013 | Maurice et al. | |

OTHER PUBLICATIONS

International Search Report and Written Opinion of International Application No. PCT/US2015/023098, mailed Jun. 25, 2015, 10 pp.

* cited by examiner

- PRIOR ART -

- PRIOR ART -

SYSTEM AND METHOD FOR PROVIDING CUSTOMIZED RESOURCES ON A HANDHELD ELECTRONIC DEVICE

CROSS-REFERENCE TO RELATED APPLICATIONS

The present application claims priority to U.S. Provisional Patent Application No. 61/973,051, filed Mar. 31, 2014, entitled "SYSTEM AND METHOD FOR PROVIDING CUSTOMIZED RESOURCES ON A HANDHELD ELECTRONIC DEVICE", which is hereby incorporated by reference herein in its entirety, and which is assigned to the same assignee as the present application.

FIELD OF THE DISCLOSURE

The present disclosure relates generally to support of multiple languages by an operating system and applications and more particularly to systems and methods for customizing support of multiple languages on a handheld electronic device.

BACKGROUND

Many handheld electronic devices, such a smartphones, provide support for multiple languages and have at least a few preloaded languages on the device. These preloaded languages are usually set by default and may or may not correspond to the user's choice of language. Some applications for handheld electronic devices support many languages that, as a result, require a large portion of memory on the device. However the user may only need one or two languages. The application package and associated resource files take up space in an electronic device's memory, even if those resource files are never accessed and never used.

BRIEF DESCRIPTION OF THE DRAWINGS

FIG. 12b is a block diagram providing details of data structures in accordance with various embodiments that are stored in memory of the apparatus shown in FIG. 12a.

DETAILED DESCRIPTION

The present disclosure provides a method of operation that includes checking for an optimize tag in an application file prior to installing the application file on an electronic device, checking properties of the electronic device in response to detecting the optimize tag, purging resource files that are not necessary for the electronic device based on the electronic device properties, and installing the application on the device.

In some embodiments, the method may further include receiving, by the electronic device, a data structure from a server, where the data structure contains all resource files for the application file. In that case, purging the resource files that are not necessary includes purging the not necessary resource files from the data structure in memory of the electronic device.

In one embodiment, the method may include providing the properties of the electronic device to a server. The data structure is then received from the server, however the data structure will be sent with only the resources needed for the electronic device based on the properties. In some embodiments, a manifest file is checked for the optimize tag. In other embodiments, the optimize tag is found by searching the data structure.

In some embodiments, resource files are purged from a data structure included in the application file. During installation of the application on the device, the data structure is stored in memory of the device.

In some embodiments, the method includes maintaining a version number of the application, after purging resource files that are not necessary for the electronic device, as a same version number previous to purging the resource files.

In one embodiment, checking properties of the electronic device in response to detecting the optimize tag involves checking languages in use on the electronic device. The method may therefore further include purging language resource files corresponding to languages that are not in use on the electronic device. In accordance with the embodiments, the language resource files are independent language resource files of a data structure, with each independent language resource file corresponding to a language for the electronic device.

In another embodiment, checking properties of the electronic device in response to detecting the optimize tag includes checking a plurality of image files for differences only in color or orientation. The method then may include purging resource files that are not necessary for the electronic device based on the electronic device properties, including identifying at least one image file as a primary image file, and purging any image files that differ from the primary image file in color or in orientation.

The present disclosure also provides an apparatus that has a non-volatile, non-transitory memory that stores an application package data structure. The application package data structure includes a common resource file and a plurality of independent language resource files. Each independent language resource file corresponds to a language. Further, the independent language resource files are removable from the application package data structure by file deletion without affecting operation of the application package when executed by a processor. The application package data structure may also include a manifest file having an optimize tag. The optimize tag is identifiable by a processor as an indication that unneeded resource files may be purged from the data structure.

Figure 1:
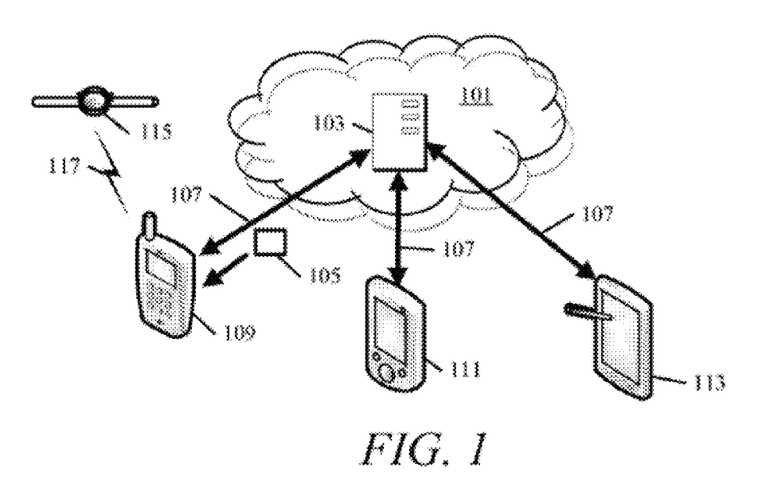
FIG. 1 is a diagram of various electronic devices communicating with a network server.

Turning now to the drawings wherein like numerals represent like components, FIG. 1 is a diagram of various electronic devices in communication with a network server 103 in accordance with the embodiments. An electronic device in accordance with the embodiments may be any of various handheld or wearable devices such as, but not limited to, a mobile telephone or smartphone 109, personal digital assistant (PDA) 111, a tablet or e-book reader 113, or a wearable device such as a smartwatch 115. Each one of these electronic devices, with the possible exception of the smartwatch 115, can each form a corresponding network connection 107 to a network 101 which may be, for example, the Internet. The network connections 107 enable the electronic device to communicate with the server 103 which may be a cloud-based server that resides within the network 101.

The electronic devices are operative to download various applications by obtaining a corresponding application package 105 from the server 103 which may subsequently be installed and run on the electronic devices. The electronic devices may also receive software upgrades from the server 103 including upgrades to various applications installed on the electronic devices. The electronic devices each include limited memory for storing an operating system and various applications. The electronic devices utilize an operating system for handheld devices; however any of various operating systems may be used in accordance with the embodiments, such as, but not limited to, Android™, Linux®, Ubuntu®, etc.

The smartwatch 115 may communicate with one or more of the other electronic devices, such as the smartphone 109, using a wireless link technology that facilitates a wireless link 117. The smartwatch 115 may receive software upgrades, application upgrades, or application downloads for installation, from the server 103 indirectly by using the wireless link 117 with the smartphone 109.

The limited memory of the various electronic device stores various "resources" or "resource files" that may be associated with one or more applications installed on the electronic devices. These resource files may be included in an application package such as application package 105. One example of a resource file in electronic devices employing an Android™ operating system ("OS") are ".arsc" files such as "resources.arsc" which may store information related to various languages that may be used on the electronic device. Another example of a resource file is one that contains drawable objects that may be displayed on a display of an electronics device by a graphics processing component. Such resource files consume memory space on the electronic device, even though such files may never be accessed or used.

In a further example of existing systems, user interface ("UI") prompts are built into ".arsc" files which are contained with an application file such as a ".apk" file in electronic devices using an Android™ operating system. In the case of language files, all languages supported by an application are included in one file along with other resource references. In accordance with the embodiments, a language resource file is split into multiple files that include a common portion and prompts per each language. The various embodiments provide methods and apparatuses for how language prompts are accessed for different languages to accommodate the file structure thereby saving memory space on an electronic device.

In accordance with the embodiments, an application file stored on an electronic device may be updated without changing the version number of the application file so that the application file may be customized to be different with respect to different resource files. Therefore, in accordance with the embodiments an electronic device OS will allow updates to an application file (such as, but not limited to, a ".apk" file) without changing the application version number when the resource files are modified.

There are several ways a user can install software onto their electronic device. These procedures include flashing the system files, upgrading files for the entire system, downloading individual applications from a server, side-installing from a portable memory device or from another linked device, or by installing downloaded files (i.e. from email, a browser, etc.).

Flashing procedures are used for flashing default software or when a user custom orders an electronic device. In accordance with the embodiments, a check procedure is performed at install time to install only the resource files (such as language files) that are in a configuration file for all software of the electronic device that has prompts. For example, a configuration file will specify which languages are selected for the electronic device.

Upgrade procedures typically involve downloading files via a data connection, and then installing those file on the electronic device. In one embodiment, the server 103 will have all resource files for the software upgrade release version. In an example related to language resources, when the electronic device performs the upgrade procedure and begins to download an upgrade file, the server 103 will check what languages are available on the electronic device and only send the relevant language resource files.

In another embodiment, the server 103 does not check the electronic device languages, but instead sends all language resources during the download procedure. In that case, the downloaded file will include all language resources. However, during installation, only the relevant ones will be installed following the flash procedure discussed above.

For application downloads from the server 103, the procedure is similar to the one described above for upgrading files. That is, in some embodiments, the server 103 will check which resources are relevant for the electronic device (such as what languages are available on the electronic device), and will re-package the application file to include only the relevant resource files. In other embodiments, the electronic device may download the full application file and discard any unneeded resource files during the installation procedure. Likewise, for any side-loaded files, a check is performed during the installation process and any unneeded resource files are discarded.

With respect to languages, in some cases, a user may specify what languages are initially installed on an electronic device at the time of purchase. However, in other cases, languages are installed by default at the time of purchase and therefore may or may not be the user's choice. In accordance with the embodiments, an option is added to a settings menu to allow users to delete and add new languages. New languages may be downloaded from an upgrade server and undesired languages may be deleted from all relevant files using the settings feature. In another embodiment, the electronic device may monitor any previous language settings by the user and, based on which languages the user is using, install or uninstall (and delete) language resource files accordingly.

Figure 2:
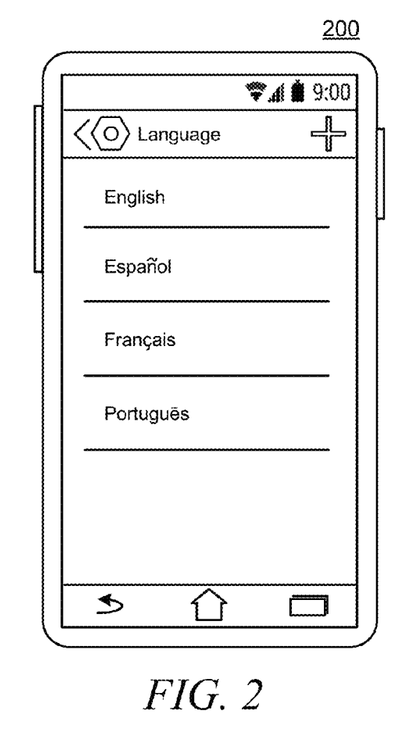
FIG. 2 is diagram of a user interface of an electronic device.

Turning to FIG. 2, a UI 200 displayed on an electronic device display is shown. A user may click on the "+" to see the available list of languages for the electronic device as shown. The user may drag any unwanted languages to the "trash" icon, shown in the upper right corner, to delete the language and corresponding language resource files from the electronic device memory.

Figure 3:
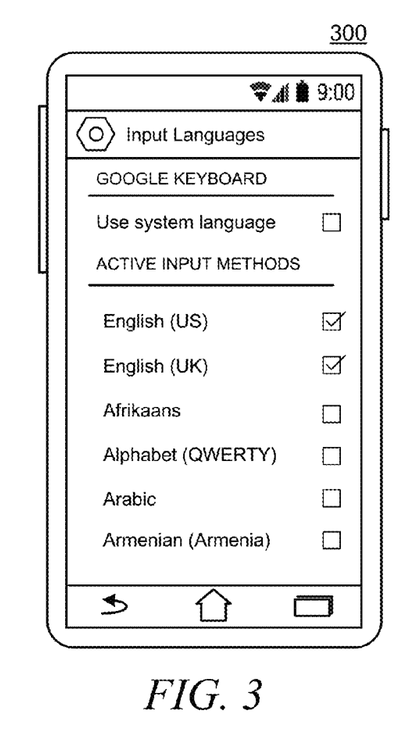
FIG. 3 is diagram of another user interface of an electronic device.

Turning to FIG. 3, another view of a UI 300 displayed on an electronic device display is shown. The user, who was previously using only US English as indicated by the checkmark to the right hand side, may decide to change the installed language input method to UK English again indicated by the checkmark on the right hand side. In this case, the electronic device will detect this and will query the user to install the language pack for the newly selected language. If the user selects "yes" then the language resource files will be downloaded from the server 103 and installed on the electronic device accordingly.

In accordance with the embodiments, the user may also customize languages on an electronic device at the time of placing an order. For example, accessing the server 103, the user/purchaser can select a language they wish to install. The server 103 may require selection of at least one language or may provide a predetermined default language that cannot be deselected. The server 103 may also restrict the language selection to a maximum number of installable languages based on a memory requirement for the electronic device. The server 103 will also provide a list all languages available for a given software application or OS version. The flash procedure will then be used to install the language resource files accordingly for the user/purchaser's new electronic device.

Figure 4:
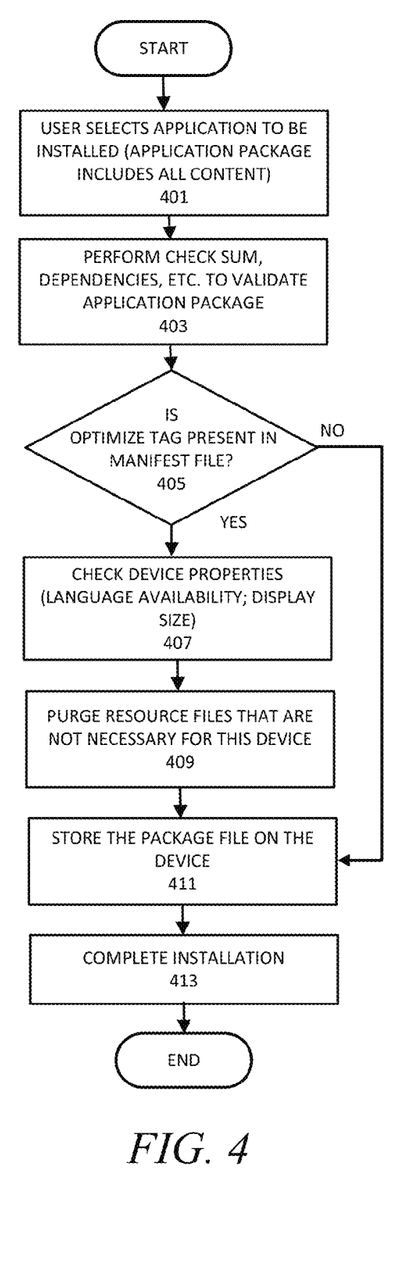
FIG. 4 is a flowchart showing a method of operation of an electronic device in accordance with some embodiments.

Further details of methods of operation for installing an application in accordance with various embodiments are provided in FIG. 4. The flowchart for FIG. 4 shows a method of operation which begins when a user selects an application to be installed on an electronic device as shown in operation block 401.

In operation block 403, a check sum is performed along with other operations to validate the application package. These procedures may be performed by an application on the electronic device. In decision block 405, the electronic device checks for an "optimize tag" in a manifest file of the application package. If the optimize tag is present at decision block 405, then a check of electronic device properties is performed in operation block 407. The checked electronic device properties may include, but are not limited to, language availability, display size, or some other properties, etc. Next, in operation block 409, any resource files that are not necessary for the electronic device are purged. The application package file is then stored on the electronic device as shown in operation block 411. In operation block 413 the installation of the application is completed and the method of operation ends. If an optimize tag is not found in the manifest file in decision block 405, the method of operation jumps to operation block 411 as shown.

Figure 5:
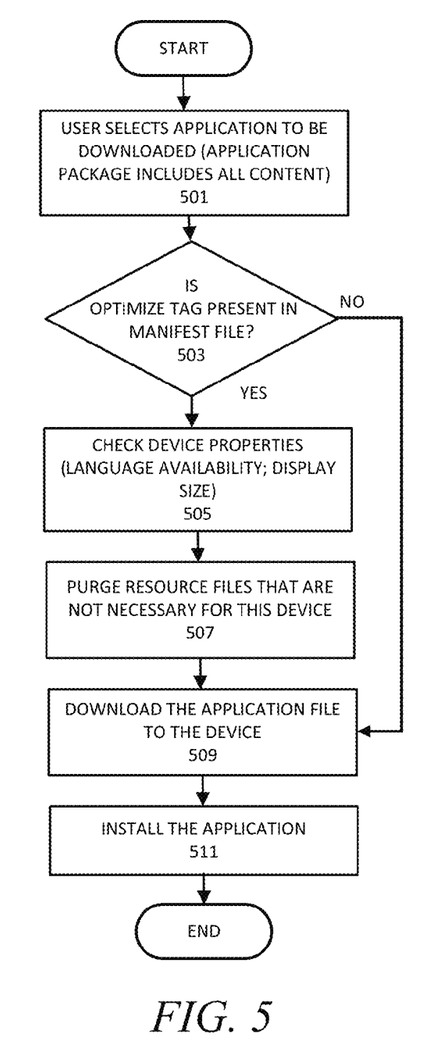
FIG. 5 is a flowchart showing a method of operation of an electronic device in accordance with some embodiments.

Further details of methods of operation for downloading an application in accordance with various embodiments are provided in FIG. 5. The flowchart for FIG. 5 shows a method of operation which begins when a user selects an application to be downloaded from a server to an electronic device as shown in operation block 501.

In decision block 503, the electronic device checks for an optimize tag in a manifest file of the application package. If the optimize tag is present at decision block 503, then a check of electronic device properties is performed in operation block 505. The checked electronic device properties may include, but are not limited to, language availability, display size, or some other properties, etc. Next, in operation block 407, any resource files that are not necessary for the electronic device are purged. The application package file is then downloaded and stored on the electronic device in operation block 509. In operation block 511 the electronic device runs an installation procedure to install the application and the method of operation ends. If an optimize tag is not found in the manifest file in decision block 503, the method of operation jumps to operation block 509 as shown. The operations of FIG. 5, decision block 503 through operation block 507, may be performed at the electronic device, or at the server 103 depending on the particular embodiment.

Figure 6:
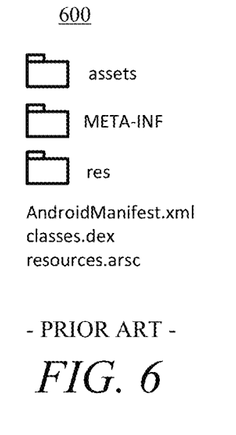
FIG. 6 is a file directory list of application package resource files in a prior art system.
Figure 7:
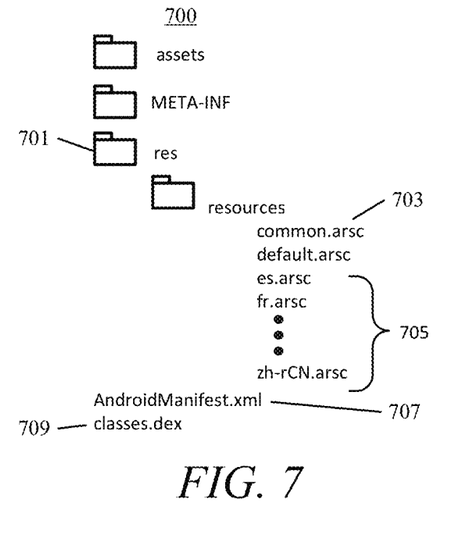
FIG. 7 illustrates an example data structure having a file directory list of application package resource files in accordance with an embodiment.

FIG. 6 shows an example prior art file directory list 600 of an application package for an Android™ OS. As can be seen from FIG. 6, a single "resources.arsc" file is used and contains the resources for all languages. In contrast, FIG. 7 is an example data structure in accordance with an embodiment. The data structure includes a file directory list 700 of an application package in accordance with an embodiment. The directory list 700 includes a "common.arsc" file 703, which cannot be purged, and which holds contents that do not pertain to language strings. Various language specific resources 705 such as "es.arsc," "fr.arsc," "zh-rCH.arsc," etc. pertain to specific languages (i.e. Spanish, French, Mandarin Chinese) and use the same identification tag as used for language settings. Individual language resource files, of the language specific resources 705, may be purged from the application package data structure without negatively impacting any functionality of the application package. It is to be understood that the example directory list 700 of the data structure is an example only and that various other file folder or file names may be used. Also, for example, the "resources" file need not be a sub folder of the "res" file 701 in the various embodiments. A manifest file 707 includes an "optimize tag" which indicates that individual language resource files of the language specific resources 705 may be purged if not needed. The data structure in the example of FIG. 7 also includes a process virtual machine related file 709 ("classes.dex") which is a DALVIK related file.

Among other advantages of the above described systems and methods, a data structure is provided having resource files that may be split with prompts into multiple independent language specific files that may be deleted or added without compromising the integrity of the data structure or the functionality of the application package. Also, updates to applications having the same version number are allowed when only adding, or deleting resource files from the data structure. Because installation procedures include checking language availability and installing only the relevant resource files at installation time, electronic device memory is conserved by using the data structure disclosed herein. On the server side, language information may be obtained from the electronic device such that an upgrade package may be customized to include only the language resource files for languages available on the electronic device. Further, the embodiments enable a user/purchaser to select a desired language or languages of choice at purchase time. The embodiments also provide a UI that enable the user to add or delete resource files at any time using a setting menu. Although the above description used language resource files for purposes of examples, various other types of resource files may also be purged from the data structure using the methods and systems herein disclosed. For example, drawables, layout files, or any resource file that specifies size or version may be purged. For electronic devices that have capabilities to project their displayed information to a larger screen size (i.e. to a larger display), this capability is also checked (for example in operation block 407 or operation block 505) and any related resource files would hence not be purged.

Another example of purging resource files from a data structure in accordance with the embodiments involves electronic device color customization. In existing systems for electronic devices, each application maintains its own resources. Each application creates different media files and themes for color differences. Likewise in existing systems, the OS creates different media files and themes based on color differences. These themes cannot be changed during runtime. If the new theme change has to be reflected in an application, all the views have to be re-inflated, as the theme based values are parsed only once during inflation.

In contrast, in accordance with the embodiments, one pool is kept in the data structure for all media and themes that are considered common Any duplicate media is therefore removed if it was created only for color differences. That is, in accordance with the embodiments, only unique application media and themes are maintained in an application resource (for example "res") folder of the data structure, and any duplicates created for a color difference are purged.

In some embodiments, a color change daemon may be called by an application to input a color or to change a theme or media (for example a ".png" file). In one example, a minimum of two color inputs may be used to create specific colors (for example, black and white may be used to produce gray, red and white may be used to produce pink, etc.).

Therefore, in accordance with the embodiments, one pool is kept of all common media and themes. Applications that use common media files and themes will therefore be changeable upon a color input. In another example, UI icons on the same display view may have different colors, while memory space is saved on the electronic device by not having to store each image, in each desired color, individually.

In accordance with the embodiments, the user may customize colors on an electronic device at the time of placing an order. For example, accessing the server 103, the user/purchaser can select a color they wish to have for an electronic device housing. Once the user has selected the housing color, the color information will be entered into the electronic device configuration file so that the software can adjust the color for the themes and media files for all applications installed on the electronic device so that the application colors match the theme color of the device housing selected by the user.

For any applications that are later installed on the electronic device, a color change daemon on the electronic device will maintain only media and themes that are unique to the application in an application resource folder (i.e. "res" folder). That is, the color change daemon will remove any duplicate files that were created for a color difference. Color changes for specific media are then implemented at runtime using color mixing, if needed, as described above to produce requested colors.

Figure 8:
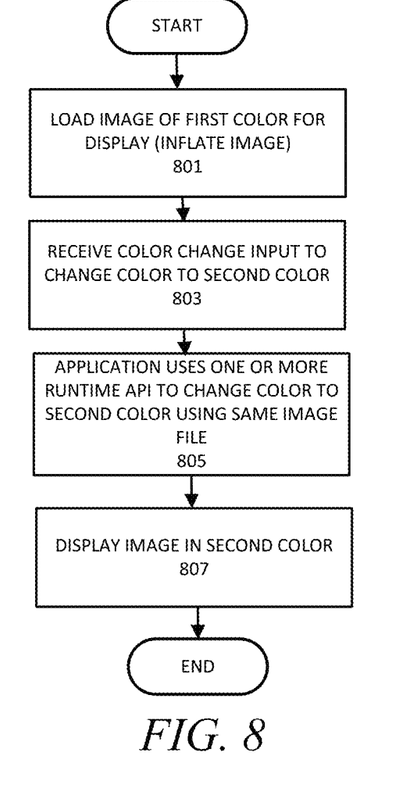
FIG. 8 is a flowchart showing a method of operation of an electronic device in accordance with some embodiments.

Further details of methods of operation for handling media color changes in accordance with various embodiments are provided in FIG. 8. The flowchart of FIG. 8 shows a method of operation which begins when an image file in a first color is loaded for display (i.e. inflated) on an electronic device as shown in operation block 801. In operation block 803, a color change input is received to change the image file to a second color. In operation block 805, the application using the image calls a color change daemon to change the color from the first color to the second color using the same image file. In operation block 807, the image is displayed in the second color and the method of operation ends.

Figure 9:
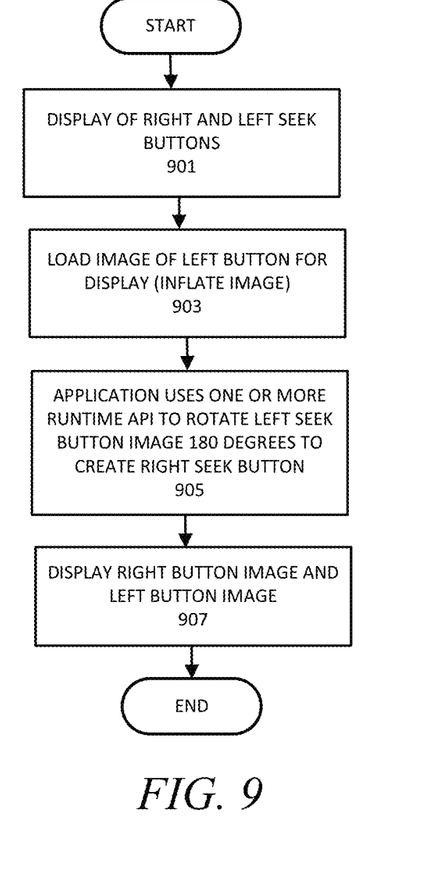
FIG. 9 is a flowchart showing a method of operation of an electronic device in accordance with some embodiments.

Further details of methods of operation for handling media position changes in accordance with various embodiments are provided in FIG. 9. The flowchart for FIG. 9 shows a method of operation which begins in operation block 901 when an electronic device is to display right and left directed "seek buttons" as, for example, in a VCR forward/reverse control or in a radio tuner dial control. In operation block 903, the image for the "left" button is loaded for display (i.e. inflated). In operation block 905, the application calls one or more runtime APIs (application programming interfaces) to rotate the left seek button image 180 degrees in order to create a "right" seek button. In operation block 907, the right seek button is displayed along with the left seek button and the method of operation ends.

Figure 10:
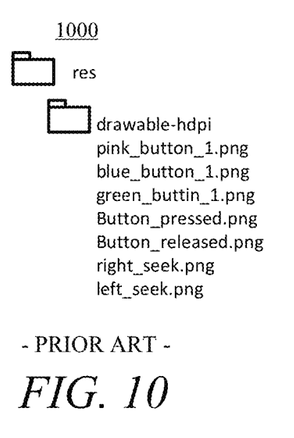
FIG. 10 is a file directory list of resource files in a prior art system.

FIG. 10 shows an example prior art file directory list 1000 of drawable content for an Android™ OS. As can be seen from FIG. 10, each application or the OS creates different media files and themes for color differences. In the example of FIG. 10, the various ".png" files are used in different XML files that represent the view. For example, a soft "button" that appears on the graphical user interface requires a drawable file for the button in a pressed position ("Button_pressed.png") and another drawable file for the button in a released position ("Button_released.png"). Similarly a "seek" control in FIG. 10 requires a right handed version ("right_seek.png") and a left handed version ("left_seek.png") in order to generate the forward and reverse controls, respectively. Also, in order to implement buttons of different colors, a ".png" file is used for each available color (i.e. "pink_button_1.png," "blue_button_1.png," and "green_button_1.png").

Figure 11:
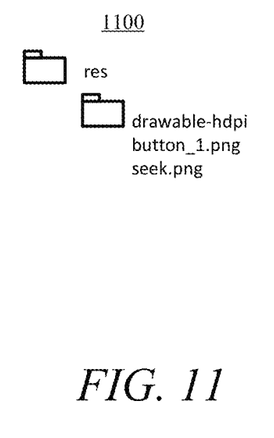
FIG. 11 illustrates an example data structure having a file directory list of resource files in accordance with an embodiment.

In contrast, FIG. 11 is an example data structure in accordance with an embodiment and includes a file directory list 1100 of drawable content. In FIG. 11, only a single drawable ("button_1.png") is used for the same graphical user interface "button" of FIG. 10. Also, only a single "seek" control is used ("seek.png"). The button drawable may be generated in any desired color by using the color mixing techniques described herein. The forward and reverse (i.e. left and right) seek controls are generated by applying appropriate rotation to the single seek.png drawable file. Therefore, as can be seen in FIG. 11, only unique application media and themes are maintained in an application resource folder (i.e. "res" folder) of the data structure, and any duplicate resource files that were created for a color difference are purged. By changing colors, shadows or both, and by rotating an image a number of degrees to the desired direction during runtime. (e.g. FM Radio seek right seek button will be rotated by 180 degrees to create the left seek button), electronic device memory space is conserved.

Therefore, among other advantages, memory is saved on an electronic device by removing duplicate media files and themes for entire OS and for each application. This is achieved in some embodiments by using a run time color change approach. Further, the embodiments provide the user with the ability to globally change media color by changing user preferences (input colors). In existing systems, this is only possible for individual applications.

Figure 12A:
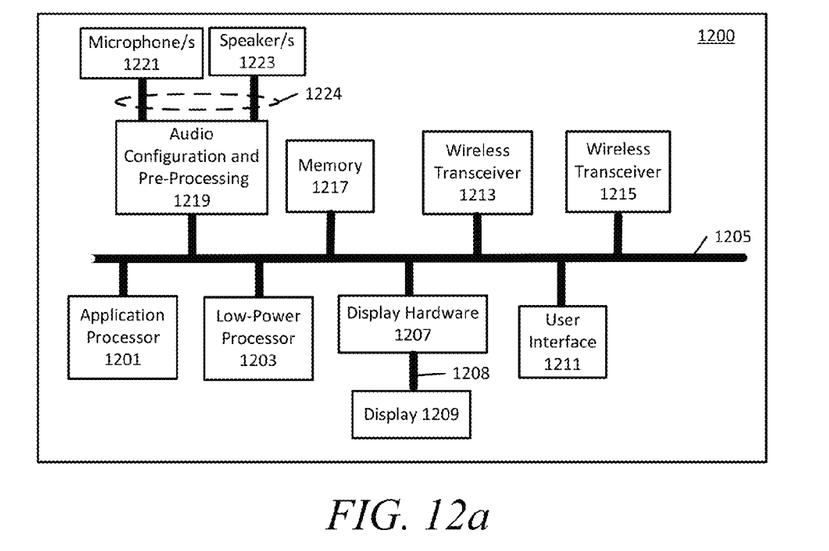
FIG. 12a is a block diagram of an example apparatus in accordance with an embodiment.

Turning now to FIG. 12*a*, a block diagram of an example apparatus of an embodiment, mobile device 1200, is provided. Mobile device 1200 is an electronic device such as, for example, a smartphone. One or more internal connection buses 1205 provide operative coupling between an application processor 1201, a low-power processor 1203 and other various mobile device 1200 components. As used herein, components may be "operatively coupled" when information can be sent between such components, even though there may be one or more intermediate or intervening components between, or along the connection path. Therefore, any of the various components connected to the one or more connection buses 1205 may be understood herein to be operatively coupled to the application processor 1201, to the low-power processor 1203, or some other component, etc. where appropriate. Further, it is to be understood that the components illustrated in FIG. 12*a* are relative to one example mobile device only and that therefore, not all components shown in the example are necessarily present in all embodiments. That is, some components shown in FIG. 12*a* may be omitted in various embodiments.

The memory 1217 is a non-volatile, non-transitory memory, and stores executable instructions (executable code) or data that may be accessed and executed by the application processor 1201 or the low-power processor 1203. The mobile device 1200 includes one or more microphones 1221 (such as a microphone array) and one or more speakers 1223 that are operatively coupled by connections 1224 to audio configuration and pre-processing logic 1219. The audio configuration and pre-processing logic 1219 may include analog-to-digital converters (ADCs), digital-to-analog converters (DACs), echo cancellation, high-pass filters, low-pass filters, band-pass filters, adjustable band filters, noise reduction filtering, automatic gain control (AGC) and other audio processing that may be applied to filter noise from audio received using the one or more microphones 1221. The audio configuration and pre-processing logic 1219 may be a single component as shown in FIG. 12*a* or may be implemented partly in hardware and partly in software or firmware executed by application processor 1201 or by low-power processor 1203. In some embodiments, the audio configuration and pre-processing logic 1219 may be implemented using several hardware components and may also utilize one or more software or firmware components in various combinations. The audio configuration and pre-processing logic 1219 may be operative to control the one or more microphones 1221 to turn certain microphones on or off or to adjust filtering or gain for purposes of various applications.

A first wireless transceiver 1213 may provide wireless communication capabilities for one or more wide area network communications systems such as, but not limited to, cellular, 2 G, 3 G or 4 G wireless communications systems and may also provide Internet connectivity over a wireless interface. In some embodiments, a second wireless transceiver 1215 may also be present in the mobile device 1200. The second wireless transceiver 1215 may provide wireless connectivity capabilities such as, but not limited to, Wi-Fi™ Bluetooth™, Wireless USB™, ZigBee™, or other technologies, etc., and may also provide Internet connectivity over any of these wireless interfaces.

The user interface 1211 may include voice control, a track ball mouse, touch sensitive elements, physical switches, gyroscopic position sensors, etc. The user interface 1211 may provide command and control signals to the application processor 1201 or to the low-power processor 1203 during various modes of operation of the mobile device 1200. A display 1209 may provide a touchscreen capability as part of the user interface 1211, and may also provide a graphical user interface (GUI) related to a mobile device operating system, a GUI related to one or more mobile device applications, etc. The display 1209 is coupled to display hardware 1207 by display bus 1208 and the display hardware 1207 is operatively coupled to the application processor 1201 and to the low-power processor 1203 by the one or more connection buses 1205. The display hardware 1207 is part of a control system that controls the display 1209.

Figure 12B:
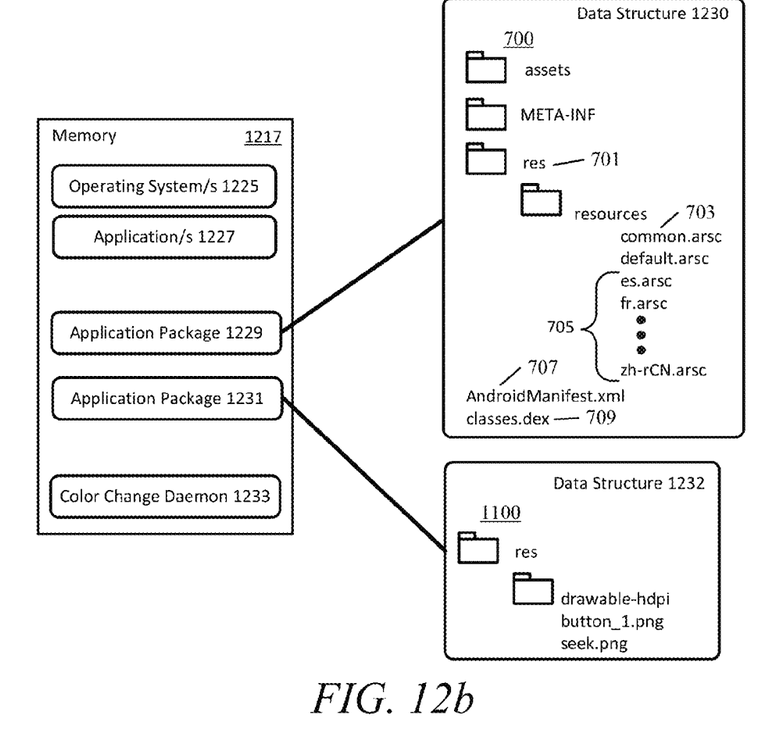

FIG. 12*b* is a block diagram providing further details of memory 1217. The memory 1217 stores executable instructions (also referred to herein as executable code) and data for one or more operating systems 1225 and for various applications 1227. The various applications 1227 may include, but are not limited to, web browsers, email programs, instant messaging clients, etc., any of which may communicate with the Internet or other networks. The memory 1217 includes at least one application package such as, for example, application package 1229 or application package 1231. The memory 1217 may also store color change daemon 1233 executable code in some embodiments.

The application processor 1201, and also the low-power processor 1203 in some embodiments, is operative to access the memory 1217 to access data or to execute stored executable instructions including the application package 1229 or application package 1231. It is to be understood that any of the above described software components (i.e. executable instructions or executable code) or any of the above described components of mobile device 1200 may be implemented as software or firmware (or a combination of software and firmware) executing on one or more processors, or using ASICs (application-specific-integrated-circuits), DSPs (digital signal processors), hardwired circuitry (logic circuitry), state machines, FPGAs (field programmable gate arrays) or combinations thereof Therefore the mobile device 1200 is one example of a mobile device and is not to be construed as a limitation on the various other possible mobile device implementations that may be used in accordance with the various embodiments.

The application package 1229 includes a data structure 1230 in accordance with an embodiment. The data structure 1230 includes the file directory list 700 that was described above with respect to FIG. 7. The application package 1231 includes a data structure 1232 in accordance with an embodiment. The data structure 1230 includes the file directory list 1100 that was described above with respect to FIG. 11. In the example embodiments of FIG. 12*a* and FIG. 12*b* both data structure 1230 and data structure 1232 are shown as present, however some embodiments may include only one or the other of the data structures (for example, only data structure 1230 may be present). Both application package 1229 and application package 1231 include an optimize tag that is readable by the application processor 1201, or by a processor residing on a server in some embodiments. The features and functions of the optimize tag were described above with respect to FIG. 4. The optimize tag may be contained within the manifest file 707 in some embodiments. The manifest file 707 may be a ".xml" file and may enumerate the resource files contained in the data structure. In some embodiments, the manifest file 707 may include a checksum for each file in the data structure, or may include a cryptographic hash. The cryptographic hash may be used by the application processor 1201 for validation of all, or part, of the application package. In some embodiments that include the cryptographic hash, a server may purge resource files from the data structure prior to sending the application package to the mobile device 1200. In that case, the server may also modify the cryptographic hash to provide validation of the application package, including the data structure, such that the application package will be found valid despite the deleted resource files. The data structures may also include a process virtual machine related file 709 such as, for example, a ".dex" file in embodiments using DALVIK.

The application package 1229 and application package 1231 may be updated from time-to-time by deleting or adding individual resource files from and to corresponding data structure 1230 and data structure 1232. For example individual language resource files of the language specific resources 705 may be purged if not needed. Alternatively, individual language resource files may be added to the language specific resources 705. Each application package has an associated version number, however, addition or deletion of resource files from the data structure does not change the application package version number in accordance with the embodiments. In other words, adding or deleting resource files will not revise the version number of the application package.

The color change daemon 1233, which was discussed above, may be called by any of the one or more applications 1227 to input a color or to change a theme or media (for example a ".png" file). In a previously provided example discussed above, a minimum of two color inputs may be used to create specific colors (for example, black and white may be used to produce gray, red and white may be used to produce pink, etc.).

The various embodiments of the present disclosure also include non-volatile, non-transitory computer readable memory, other than memory 1217, that may contain executable instructions (i.e. executable code), for execution by at least one processor, that when executed, cause the at least one processor to operate in accordance with the functionality and methods of operation herein described. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices such as servers, mobile devices or other devices such as those that may benefit from the features of the herein described embodiments. This memory may also store and contain the data structure 1230, the data structure 1232, or both. In another embodiment, a non-volatile, non-transitory computer readable memory, other than memory 1217, may store and contain the data structure 1230, the data structure 1232 or both data structures. The data structures thus stored may be read by the application processor 1201 and installed and stored in the memory 1217.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A mobile device, comprising:
    a memory;
    an application package data structure stored in the memory, the application package data structure comprising:
        a common resource file;
        a plurality of independent language resource files, each independent language resource file corresponding to a language, the independent language resource files being removable from the application package data structure by file deletion without affecting operation of a corresponding application package when executed by a processor; and
        a manifest file having an optimize tag, the optimize tag identifiable by the processor as an indication that unneeded resource files may be purged from the data structure,
    wherein the processor is operatively coupled to the memory and is operable to:
        check for the optimize tag in the application package data structure prior to installing the corresponding application package on the mobile device;
        check mobile device properties in response to detecting the optimize tag;
        purge resource files from the application package data structure that are not necessary for the mobile device based on the mobile device properties; and
        install the corresponding application package on the mobile device.

2. The mobile device of claim 1, wherein the processor is further operative to:
    provide the mobile device properties to a server; and
    receive the data structure from the server, the application package data structure having only resources needed for the mobile device based on the mobile device properties.

3. The mobile device of claim 1, wherein the processor is further operative to:
    check a manifest file of the application package data structure for the optimize tag.

4. The mobile device of claim 1, wherein the processor is further operative to check the mobile device properties in response to detecting the optimize tag, by checking languages in use on the mobile device.

5. The mobile device of claim 4, wherein the processor is further operative to purge resource files that are not necessary for the mobile device based on the mobile device properties, by purging language resource files corresponding to languages that are not in use on the mobile device, wherein the language resource files are independent language resource files of the application package data structure, each independent language resource file corresponding to a language for the mobile device.

6. The mobile device of claim 1, wherein the mobile device is a smartphone.

7. A method comprising:
    prior to installing an application package on an electronic device, checking, by the electronic device, for an optimize tag in the application package, the application package including at least a plurality of independent language resource files, each independent language resource file corresponding to a language and being removable from the application package by file deletion without affecting operation of a corresponding application when executed by the electronic device;
    responsive to detecting the optimize tag in the application package, checking, by the electronic device, properties of the electronic device, the properties including language availability;
    purging, by the electronic device, from the application package, and based on the properties of the electronic device, one or more independent language resource files from the plurality of independent language resource files that are not necessary for the electronic device; and
    after purging the one or more independent language resource files that are not necessary for the electronic device from the application package, installing the application package on the electronic device.

8. The method of claimed 7, further comprising:
receiving, by the electronic device, a data structure from a server, the data structure comprising all resource files for the application package; and
wherein purging the one or more independent language resource files that are not necessary for the electronic device based on the electronic device properties comprises purging the one or more independent language resource files that are not necessary for the electronic device from the data structure in memory of the electronic device.

9. The method of claim 7, further comprising:
providing the properties of the electronic device to a server; and
receiving a data structure from the server, the data structure having only resources needed for the electronic device based on the properties.

10. The method of claim 7, wherein purging the resource files that are not necessary for the electronic device comprises:
purging the resource files from a data structure included in the application package.

11. The method of claim 10, further comprising:
installing the application package on the electronic device including storing the data structure in a memory of the electronic device.

12. The method of claim 7, further comprising:
maintaining a version number of the application package, after purging the resource files that are not necessary for the electronic device, as a same version number previous to purging the resource files.

13. The method of claim 7, wherein checking properties of the electronic device in response to detecting the optimize tag, comprises:
checking a plurality of image files for differences only in color or orientation.

14. The method of claim 13, further comprising:
prior to installing the application package:
identifying at least one image file as a primary image file; and
purging any image files that differ from the primary image file in color or in orientation.

* * * * *

UNITED STATES PATENT AND TRADEMARK OFFICE
CERTIFICATE OF CORRECTION

PATENT NO.       : 9,501,270 B2
APPLICATION NO.  : 14/300280
DATED            : November 22, 2016
INVENTOR(S)      : Yukiko Kimoto et al.

It is certified that error appears in the above-identified patent and that said Letters Patent is hereby corrected as shown below:

Column 12, Line 49 (Claim 7): "resource files," should read --resource files and a manifest file,--

Column 12, Line 53 (Claim 7): "when executed by the electronic device;" should read --when executed by the electronic device, and the manifest file having the optimize tag;--

Column 12, Lines 54/55 (Claim 7): "detecting the optimize tag in the application package" should read --detecting the optimize tag in the manifest file:--

Column 12, Line 57 (Claim 7): "availability;" should read --availability; and--

Signed and Sealed this
Eleventh Day of April, 2017

Michelle K. Lee
*Director of the United States Patent and Trademark Office*